(12) United States Patent
Jeffries et al.

(10) Patent No.: US 12,735,923 B2
(45) Date of Patent: Sep. 15, 2026

(54) LATCH FOR BENCH

(71) Applicant: AUSTIN HARDWARE & SUPPLY, INC., Lee's Summit, MO (US)

(72) Inventors: Mark Jeffries, Buford, GA (US); Robert Walden, Buford, GA (US)

(73) Assignee: Austin Hardware & Supply, Inc., Lee's Summit, MO (US)

( * ) Notice: Subject to any disclaimer, the term of this patent is extended or adjusted under 35 U.S.C. 154(b) by 147 days.

(21) Appl. No.: 18/646,342

(22) Filed: Apr. 25, 2024

(65) Prior Publication Data

US 2024/0360707 A1 Oct. 31, 2024

Related U.S. Application Data

(60) Provisional application No. 63/462,134, filed on Apr. 26, 2023.

(51) Int. Cl.

| | |
|---|---|
| ***E05B 85/22*** | (2014.01) |
| ***A61G 3/00*** | (2006.01) |
| ***B60R 7/04*** | (2006.01) |
| ***E05B 85/04*** | (2014.01) |
| ***E05B 85/14*** | (2014.01) |

(52) U.S. Cl.

CPC ................ *E05B 85/22* (2013.01); *A61G 3/00* (2013.01); *B60R 7/043* (2013.01); *E05B 85/04* (2013.01); *E05B 85/14* (2013.01)

(58) Field of Classification Search

CPC .. E05B 65/0092; E05B 65/52; E05B 65/5207; E05B 65/5215; E05B 65/523; E05B 65/5223; E05B 65/5238; E05B 63/0052; E05B 63/0013; E05B 63/0017; E05B 15/02; E05B 2015/0235; E05B 7/00; E05B 85/14; E05C 1/00; E05C 1/004; E05C 1/006; E05C 1/08; E05C 1/085; E05C 1/12; E05C 1/14; E05C 9/04; E05C 9/085; E05C 9/14; E05C 9/045; E05C 9/048; E05C 9/145; A61G 3/00; B60R 5/00

See application file for complete search history.

(56) References Cited

U.S. PATENT DOCUMENTS

| | | | | |
|---|---|---|---|---|
| 3,902,628 | A * | 9/1975 | Schurman | B65D 43/164 220/835 |
| 4,781,407 | A * | 11/1988 | Rauchhaus | E05B 83/30 292/37 |
| D482,593 | S * | 11/2003 | Wolf | D8/342 |
| 8,740,300 | B2 * | 6/2014 | Daniels, Jr. | B60N 2/305 297/14 |
| 8,997,535 | B2 | 4/2015 | Jeffries | |
| 9,610,899 | B2 * | 4/2017 | Pywell | B60R 7/043 |

(Continued)

FOREIGN PATENT DOCUMENTS

| | | | | |
|---|---|---|---|---|
| AU | 2001100001 A4 * | 8/2001 | | |
| CN | 110778220 A * | 2/2020 | | E05B 47/0012 |

*Primary Examiner* — Kristina R Fulton
*Assistant Examiner* — Emily G. Brown
(74) *Attorney, Agent, or Firm* — Polsinelli PC

(57) ABSTRACT

A latch for a bench includes a bracket, a dual cam, and a handle. The latch engages to strikers to secure the latch in a closed position. The handle is pivotally engaged to the bracket. An upward or lifting movement applied to the handle moves the dual cam upward. The dual cam includes ramp surfaces which drive locking bolts inward to disengage from the strikers.

19 Claims, 10 Drawing Sheets

(56) References Cited

U.S. PATENT DOCUMENTS

| | | | | |
|---|---|---|---|---|
| 10,337,221 | B2 | 7/2019 | Jeffries et al. | |
| 10,455,937 | B2 | 10/2019 | Jeffries et al. | |
| 11,834,878 | B2 | 12/2023 | Jeffries | |
| 2004/0017088 | A1* | 1/2004 | Sawatani | E05B 83/30 292/178 |
| 2011/0049145 | A1* | 3/2011 | Yamauchi | B65D 11/1833 220/7 |
| 2018/0230723 | A1 | 8/2018 | Jeffries | |
| 2019/0239650 | A1* | 8/2019 | Nelson | E05B 65/5284 |
| 2019/0277075 | A1 | 9/2019 | Jeffries | |
| 2020/0146454 | A1* | 5/2020 | Wesley | E05B 49/00 |
| 2020/0323376 | A1* | 10/2020 | Waisanen | G08B 13/1966 |
| 2022/0251888 | A1* | 8/2022 | Scelzi | E05C 9/002 |
| 2022/0403682 | A1* | 12/2022 | Bergum | E05B 17/002 |

* cited by examiner 464
460
462
460

10
100
120
122
124
130
132
134
140
150
110
200
300
302
304
310
315
325
400
410
420
430
500

LATCH FOR BENCH

The present application claims priority to U.S. Provisional Patent No. 63/462,134 filed Apr. 26, 2023, which is incorporated by reference.

FIELD OF INVENTION

The present invention relates to a latch for a bench.

BACKGROUND OF INVENTION

Squad benches are often installed in a rear portion of ambulances or other emergency vehicles. The squad benches are typically installed along the sidewalls of the vehicle.

Latches for such squad benches typically require two handed movement, i.e., one hand of a user manipulates the latch and a second hand of the user lifts a lid of the squad bench. This may prove cumbersome to the emergency personnel who may already be holding emergency equipment and gear.

Further, latches for such squad benches typically include strikers, linkages, or other moving parts in an interior of the bench. Items stored inside of the bench may interfere, jam or get tangled with the strikers, linkages or other moving parts.

SUMMARY OF INVENTION

A latch for a bench is described. The latch may be installed on squad benches typically installed in a rear portion of ambulances or other emergency vehicles. The squad benches often include a padded upper surface on a lid for seating of emergency personal. The lid is hingedly engaged to a lower portion. The lower portion may include an interior space for storage.

The latch includes a bracket, a dual cam, and a handle. The latch is installed on the lid of the squad bench. Bolts extend and retract from the bracket. The bolts of the latch engage strikers to secure the latch in a closed position. The strikers are installed on the lower portion of the squad bench. The handle is pivotally engaged to the bracket. An upward or lifting movement applied to the handle moves the dual cam upward. The upward movement of dual cam drives the bolts inward to disengage from the strikers.

The dual cams include ramp surfaces. When the dual cam is moved upward, the ramp surfaces drive against wheels or rollers engaged to interior ends of the bolts. The ramp surfaces angle inward and downward to a center of the latch. When the dual cam is moved upward, the ramps press against the wheels or the rollers, which retracts the bolts inward.

The latch translates the pulling force applied to the handle to the upward movement of the dual cam. When the dual cam moves upward, the ramp surfaces pull the bolts inward toward the latch.

In one aspect, a latch for a squad bench is described. The latch includes a bracket. A dual cam is positioned in a compartment of the bracket. The dual cam includes a first ramp surface and a second ramp surface. A handle is pivotally engaged to the bracket. A first bolt and second bolt extend and retract from the bracket. The first bolt is configured to engage a first striker. The second bolt is configured to engage a second striker. The handle is configured to drive the dual cam upward. The first ramp surface is configured to drive the first bolt inward, and the second ramp surface is configured to drive the second bolt inward. The latch and strikers may be installed on exterior surfaces of the squad bench.

In another aspect, the latch includes a bracket, a cam, and a handle. The latch is installed on the lid of the squad bench. Bolts extend and retract from the bracket. The bolts of the latch engage strikers to secure the latch in a closed position. The bolts are not linked to the handle or the cam. When the lid is closed, the bolts retract but the cam and handle do not move, as the bolts retract independently of the cam and the handle. This provides convenience for the user as the handle does not pop up when the user is closing the lid.

In another aspect, a latch for a bench is described. The latch includes a bracket. A dual cam is positioned in a compartment of the bracket. The dual cam includes a first ramp surface and a second ramp surface. A handle is pivotally engaged to the bracket. A first bolt and a second bolt are configured to extend and retract from the bracket. The first bolt is configured to engage a first striker. The second bolt configured to engage a second striker. The handle is configured to drive the dual cam upward. The first ramp surface is configured to drive the first bolt inward, and the second ramp surface is configured to drive the second bolt inward.

In another aspect, a latch for a bench is described. The latch includes a bracket. A dual cam is configured to move relative to the bracket. The dual cam includes a first ramp surface and a second ramp surface. A handle is rotatably engaged to the bracket. The handle is configured to rotate relative to the bracket. The handle includes a cam roller axle with a first cam roller and a second cam roller rotatably mounted on the cam roller axle. The cam roller axle is offset or spaced from an axis of rotation of the handle. A first bolt positions a first wheel or bearing against the first ramp surface. The second bolt positions a second wheel or bearing against the second ramp surface. The first bolt is configured to engage a first striker. The second bolt is configured to engage a second striker. A lifting movement applied to the handle drives the first cam roller and a second cam roller against the dual cam, which drives the dual cam upward.

In another aspect, a latch for a bench is described. The latch includes a bracket. The bracket includes interior walls. A dual cam is movably positioned between the interior walls of the bracket. The dual cam includes a first ramp surface and a second ramp surface. A cam spring is positioned between the bracket and the dual cam to urge the dual cam downward. A handle is engaged to the bracket via handle pins. The handle is configured to rotate relative to the bracket via the handle pins. The handle includes a cam roller axle with a first cam roller and a second cam roller rotatably mounted on the cam roller axle. The cam roller axle is offset or spaced from the handle pins. The first cam roller and the second cam roller are configured to urge against a bottom surface of the dual cam to move the dual cam upward. The latch includes a first bolt and second bolt. The first and second bolt are biased outward. The first bolt positions a first wheel against the first ramp surface, and the second bolt positions a second wheel against the second ramp surface.

DETAILED DESCRIPTION

Figure 1:
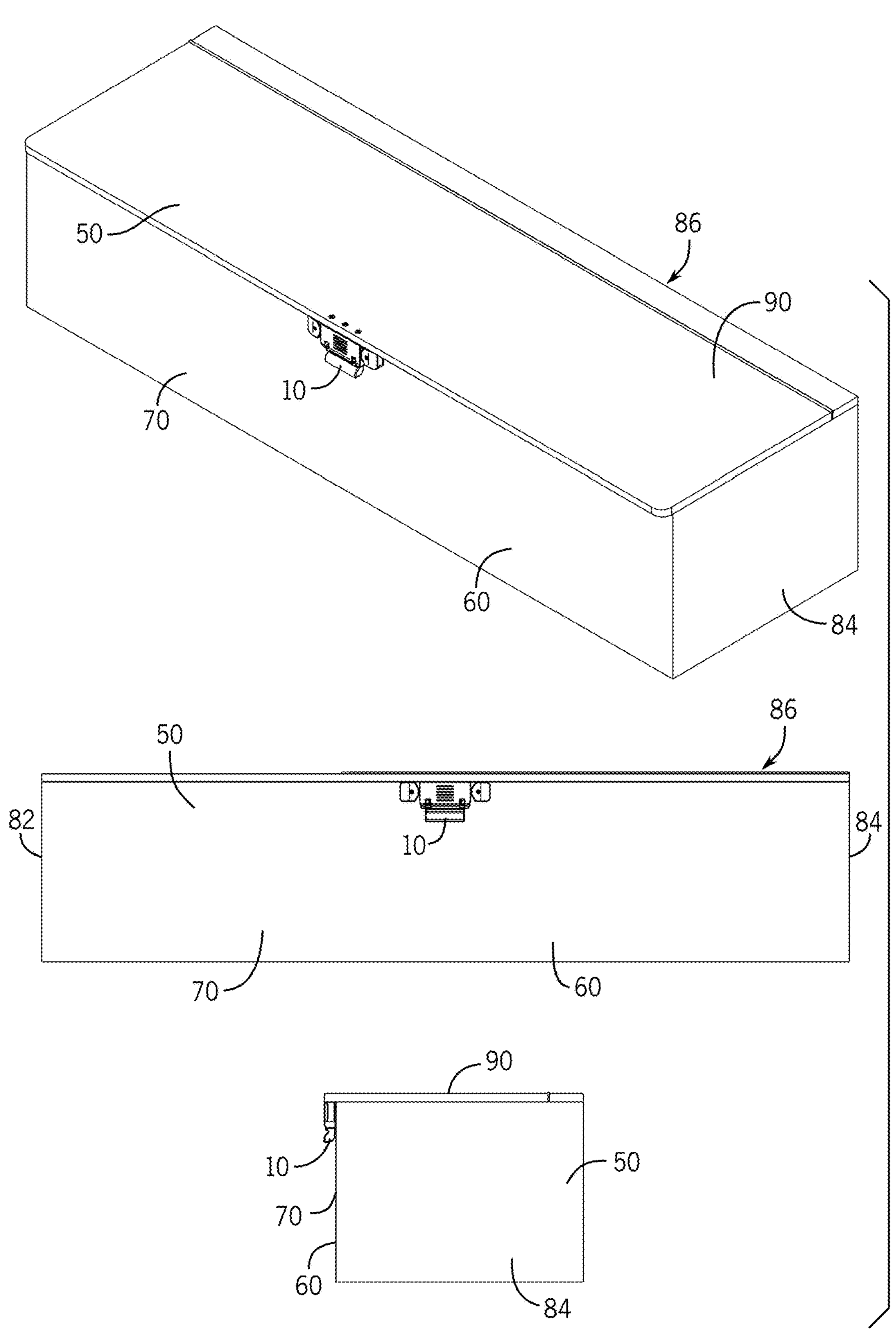
FIG. 1 are views of the latch installed on the squad bench.

A latch 10 for a squad bench 50 is described with reference to FIGS. 1-10. The squad bench 50 includes a lower portion 60 and a lid 90. The lower portion 60 includes a front wall 70, a first sidewall 82, a second sidewall 84 and a rear wall 86. Of course, in certain aspects, the squad bench 50 may be built into or customized to the ambulance and the first sidewall 82, second sidewall 84, or the rear wall 86 may be omitted. Of course, the latch 10 may be used with other benches than the squad bench 50.

The latch 10 may be installed on the lower portion 60 and the lid 90 without cutouts in the lower portion 60 or the lid 90. Installation of the latch 10 is easy and uses common power tools. The latch 10 includes a bracket 100, a dual cam 200, and a handle 300. The latch 10 engages a first striker 440 and a second striker 460 to secure or latch the lid 90 in a closed position.

A first bolt 400 and a second bolt 420 extend outward from the latch 10 to engage the first striker 440 and the second striker 460. The latch 10 is typically installed on an underneath surface 92 of the lid 90 that overhangs the front wall 70. In other aspects, the latch 10 may be installed on a front edge 94 of the lid 90.

The first striker 440 and the second striker 460 are typically installed on an exterior surface 72 of the front wall 70. When the lid 90 is closed, the latch 10 is positioned between the first striker 440 and the second striker 460. In this aspect, the latch 10 moves with the lid 90.

The user may open the latch 10 by simply pulling the handle 300 and continuing to pull the handle 300 to swing the lid 90 upward. This provides a smooth, one-handed opening operation of the squad bench 50.

The first bolt 400 and the second bolt 420 automatically secure to the first striker 440 and the second striker 460 when the lid 90 is closed by pushing the lid 90 closed or by the lid 90 falling to a closed position via gravity. The latch 10 provides a slam to close feature. The latch 10 automatically latches to the to the first striker 440 and the second striker 460 when the lid 90 is closed. The user does not need to operate the handle 300 in order to secure the latch 10.

The first striker 440 include a contact surface 442, and the second striker 460 includes a contact surface 462. The contact surfaces 442 and 462 angle inward toward a center of the latch 10. With respect to FIG. 7, the contact surfaces 442 and 462 form an angle of approximately 30 degrees to approximately 60 degrees with respect to the first bolt 400 and the 420. When the lid 90 is closed, an outer end 402 of the first bolt 400 is urged against the contact surface 442 and an outer end 422 of the second bolt 420 is urged against the contact surface 462. As the lid 90 is closed, the first bolt 400 and the second bolt 420 are driven inward toward the center of the latch 10 by the downward slopes of the contact surfaces 442 and 462. The first striker 440 further includes an opening 444, and the second striker 460 further includes an opening 464. When the lid 90 is fully closed, the first bolt 400 enters the opening 444 and the second bolt 420 enters the opening 464.

Figure 2:
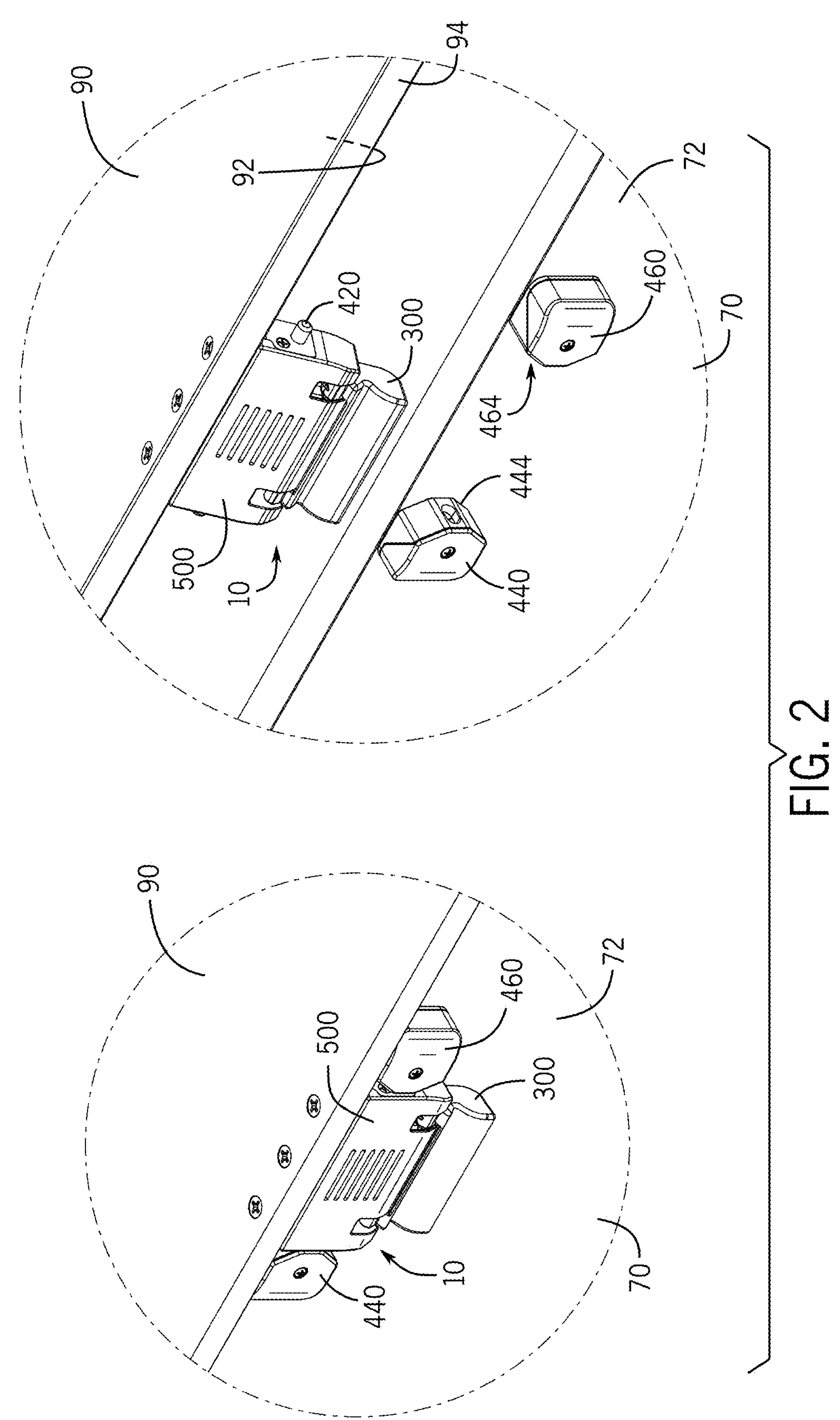
FIG. 2 are views of the latch and strikers installed on the squad bench.
Figure 3:
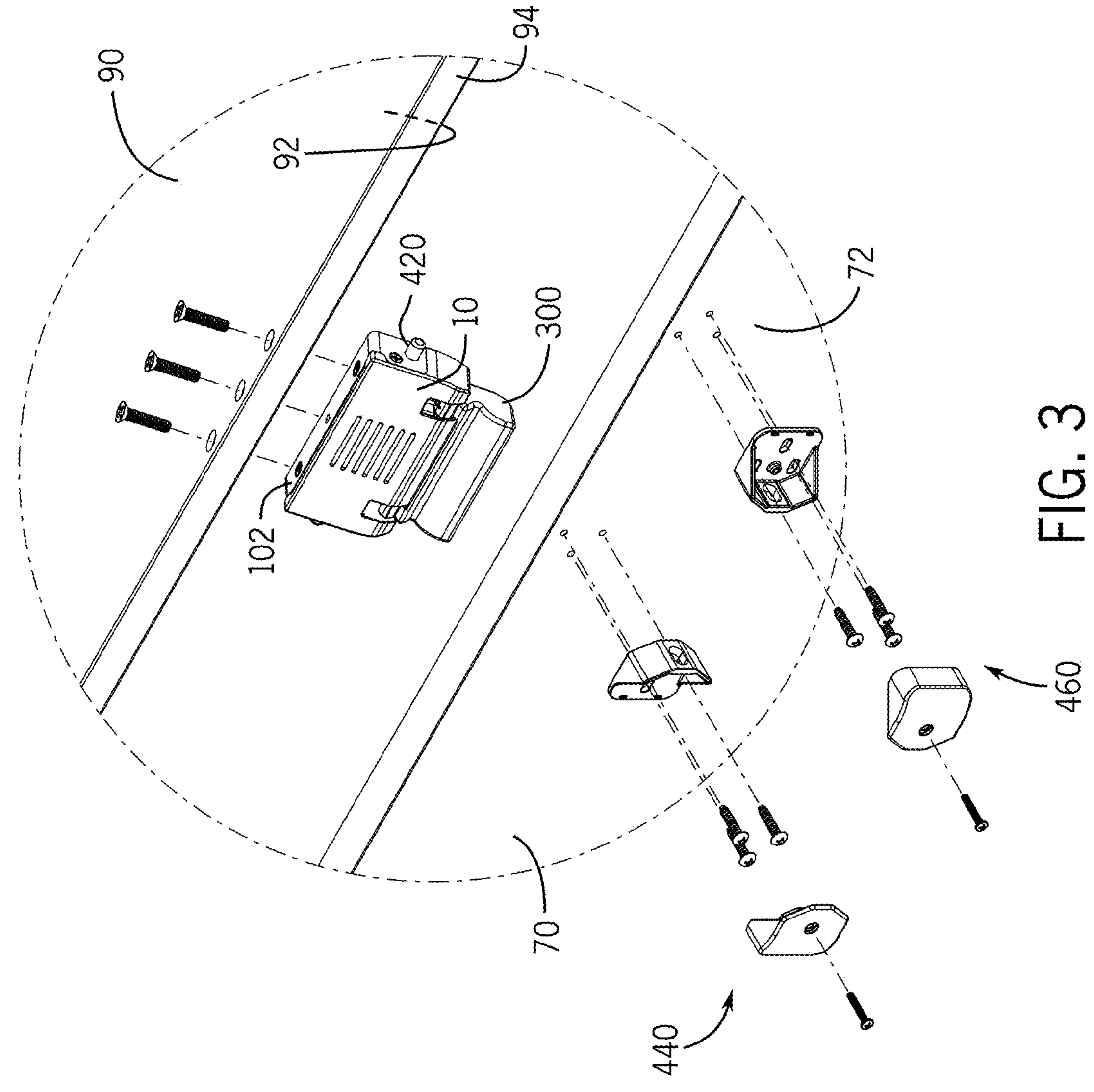
FIG. 3 is a view of the installation of the latch and strikers on the squad bench.

With respect to FIGS. 1-3, in this aspect, the bracket 100 is installed on the underneath surface 92 of the lid 90 that overhangs the front wall 70. An upper surface 102 of the bracket 100 is fastened with bolts to the underneath surface 92. During operation of the latch 10, the bracket 100 remains fixed to the underneath surface 92.

Figure 4:
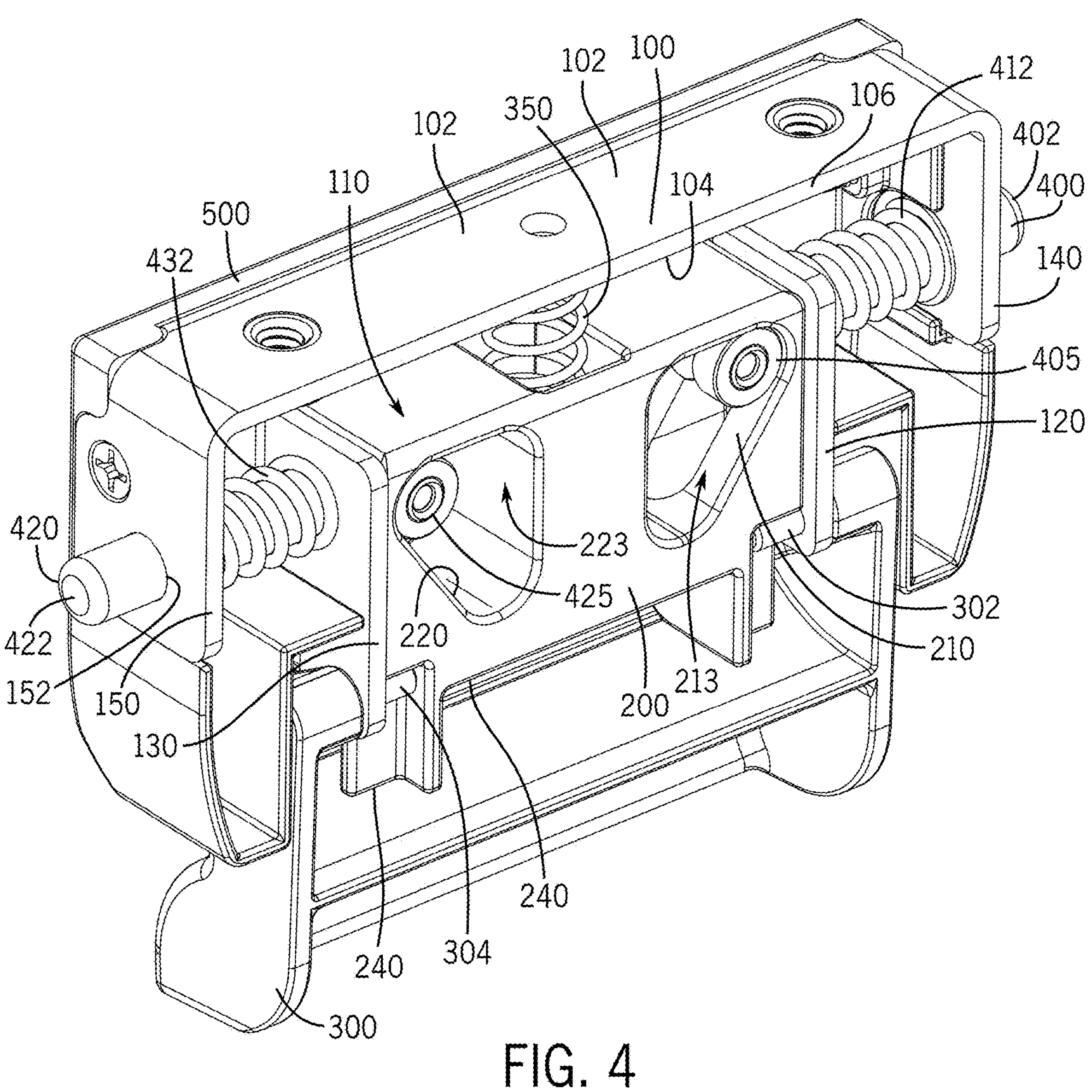
FIG. 4 is a rear view of the latch.
Figure 5:
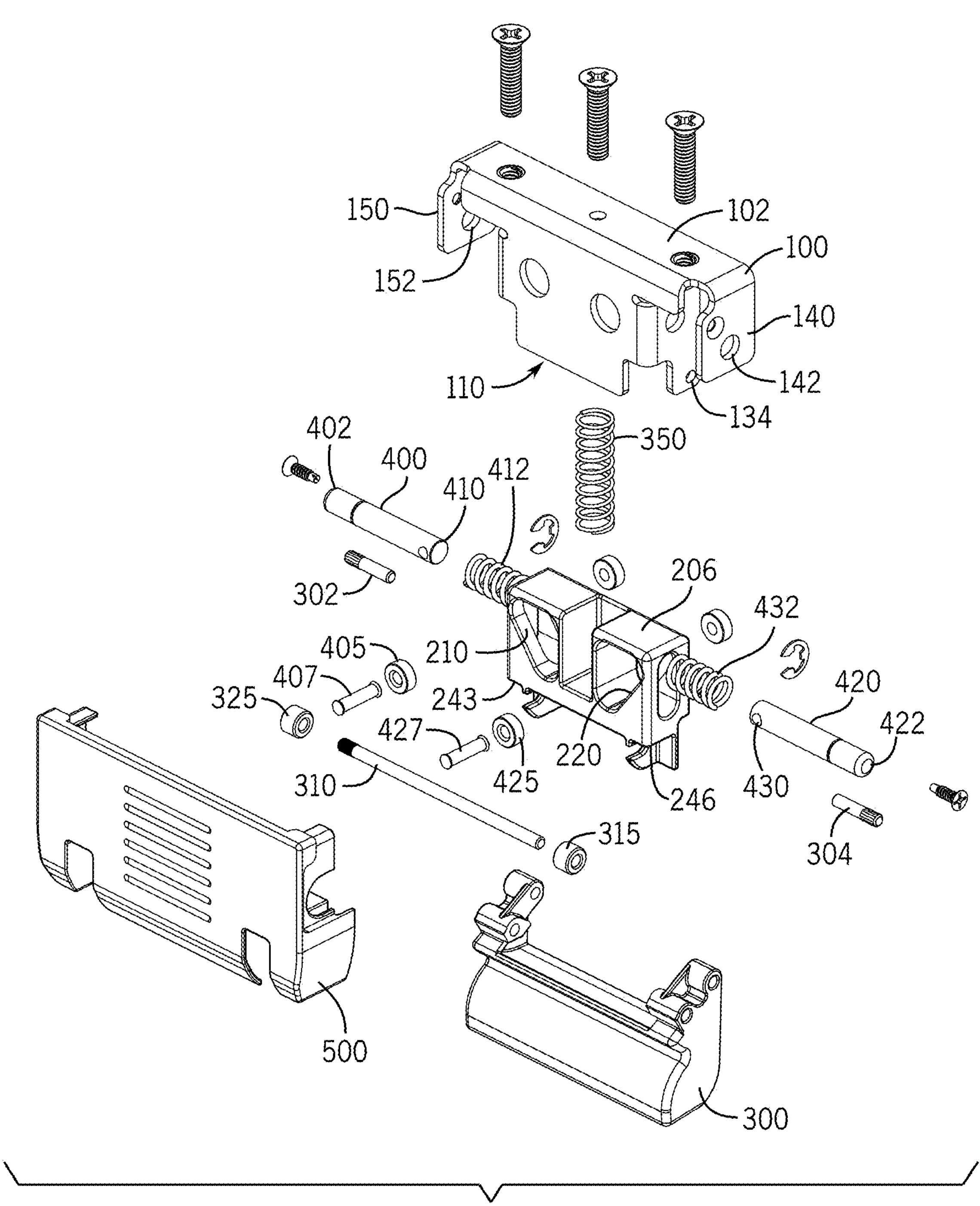
FIG. 5 is an exploded view of the latch.
Figure 6:
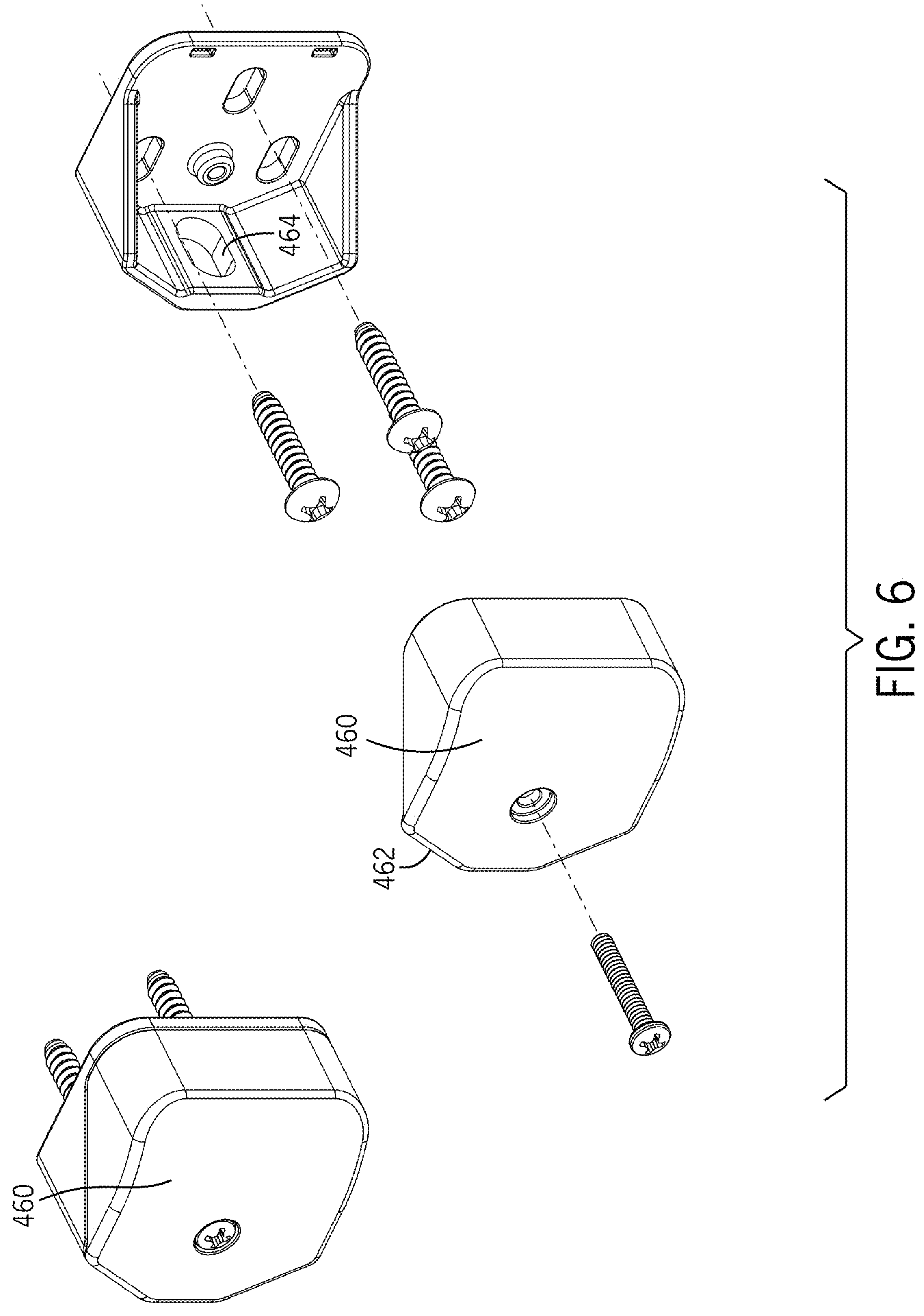
FIG. 6 is an exploded view of the striker.
Figure 7:
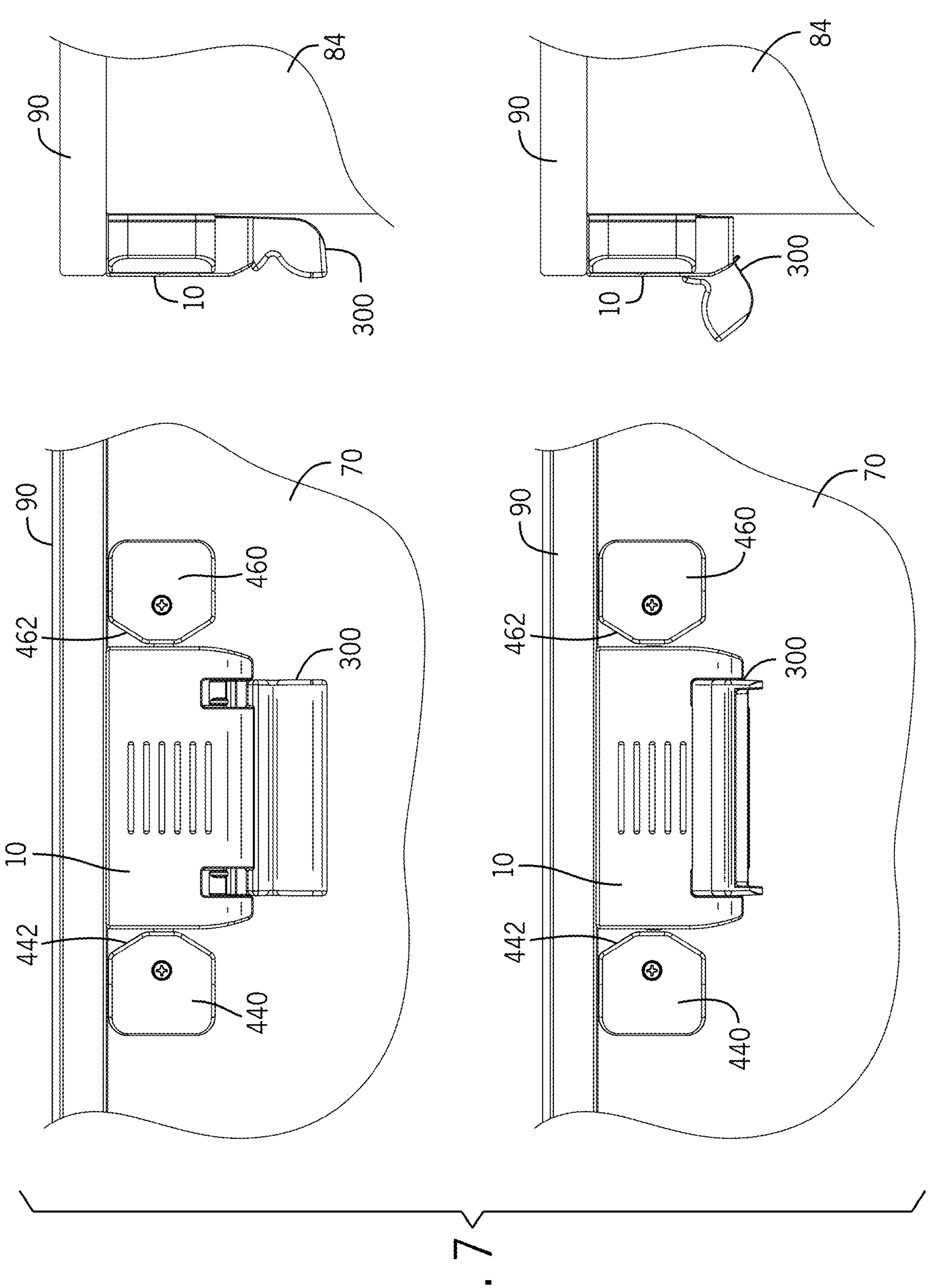
FIG. 7 are views of the latch and striker.

With respect to FIG. 4, a rear side of the bracket 100 receives the dual cam 200. The rear side of the bracket 100 forms or defines a compartment 110 that receives the dual cam 200 and provides a travel space for the dual cam 200 to move upward and downward. The dual cam 200 moves vertically with respect to the bracket 100.

The handle 300 is pivotally engaged to the bracket 100 via the handle pins 302 and 304. The handle 300 further includes a cam roller axle 310 with a cam roller 315 and a cam roller 325 rotatably mounted on the cam roller axle 310. The cam roller axle 310 is offset or spaced from the handle pins 302 and 304. When the handle 300 is pulled upward and rotates relative to the handle pin 302 and 304, the cam rollers 315 and 325 are moved upward and drive against contact surfaces 243 and 246 on a lower surface 240 of the dual cam 200. This drives the dual cam 200 upward. The cam rollers 315 and 325 are moved upward in arcuate path or curving fashion to drive against the contact surfaces 243 and 246 of the dual cam 200.

The bracket 100 includes inner lateral walls 120 and 130 and outer lateral walls 140 and 150. The inner lateral walls 120 and 130 help to define the compartment 110 and help to stabilize the movement of the dual cam 200. The dual cam 200 is positioned between the inner lateral walls 120 and 130. The inner lateral walls 120 and 130 include openings 122 and 132 for passage of the first bolt 400 and the second bolt 420, respectively. The inner lateral walls 120 and 130 further include openings 124 and 134 to receive handle pins 302 and 304, respectively. The outer lateral walls 140 and 150 further include openings 142 and 152 for passage of the first bolt 400 and the second bolt 420, respectively.

The dual cam 200 includes a first ramp surface 210 and a second ramp surface 220. The first ramp surface 210 and the second ramp surface 220 angle inward and downward toward a center of the dual cam 200. As described below, the first ramp surface 210 drives against a first wheel 405, and the second ramp surface 220 drive against a second wheel 425 in order to drive the first bolt 400 and the second bolt 420 inward.

Figure 8:
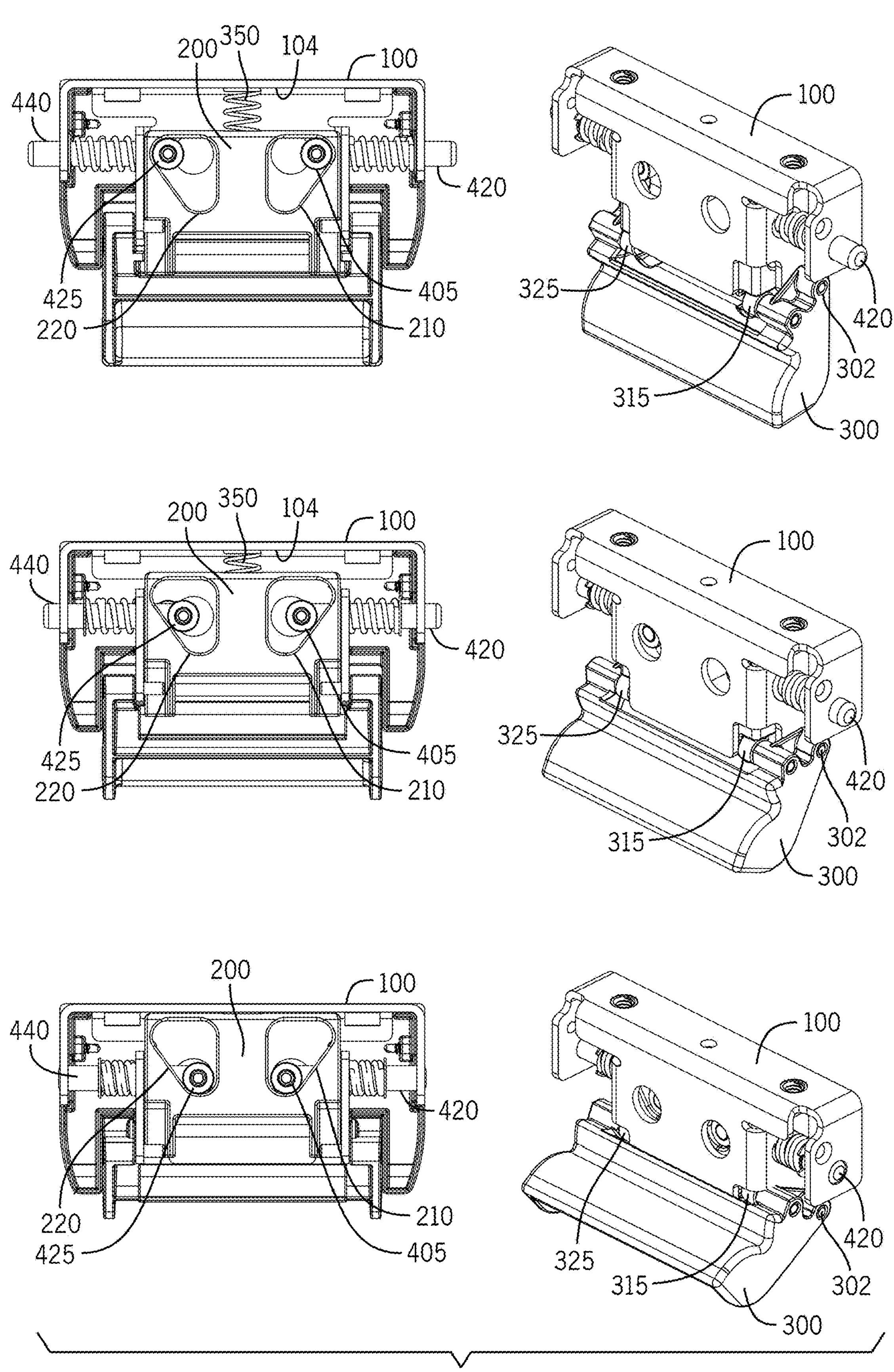
FIG. 8 are views of the latch with the handle moving from down to up.

In this aspect, the dual cam 200 defines a first opening 213 and a second opening 223 adjacent to the first ramp surface 210 and second ramp surface 220, respectively. The first bolt 400 positions the first wheel 405 against the first ramp surface 210. A first wheel axle 407 rotatably engages the first wheel 405 to an inner end 410 of the first bolt 400. Similarly, the second bolt 420 positions the second wheel 425 against the second ramp surface 220. A second wheel axle 427 rotatably engages the second wheel 425 to an inner end 430 of the second bolt 420. When the handle 300 is lifted, the first ramp surface 210 and the second ramp surface 220 urge against the first wheel 405 and the second wheel 425, respectively. This contact between the ramp surfaces 210 and 220 drives the first bolt 400 and the second bolt 420 inward. As shown in FIG. 8, the wheels 405 and 425 move inwardly as the dual cam 200 is moved upward and the sloped ramp surfaces 210 and 220 pushes against the wheels 405 and 425. The wheels 405 and 420 move inward and thus retract the first bolt 400 and the second bolt 420. In certain aspects, an axis of rotation of the wheels 405 and 420 is generally perpendicular to the first bolt 400 and the second bolt 420.

The first bolt 400 is urged or biased outward via a first spring 412. Similarly, the second bolt 420 is urged or biased outward via a second spring 432. When the handle 300 is lifted, the force of the spring 412 and 432 is overcome and both the first bolt 400 and the 420 are driven inward. When the handle 300 is released, both the first bolt 400 and the second bolt 420 are driven outward by the first spring 412 and the second spring 432, respectively.

A cam spring 350 is positioned between a lower surface 104 of a top wall 106 of the bracket 100 and the dual cam 200. The cam spring 350 urges or drives the dual cam 200 downward, which biases the handle 300 to a closed position. A cover 500 is fastened or positioned over the bracket 100 to cover the moving parts in the bracket 100.

During use of the latch 10, the user lifts or pulls the handle 300 upward. This moves the cam rollers 315 and 325 upward and to drive against the contact surfaces 243 and 246 on the lower surface 240 of the dual cam 200. This drives the dual cam 200 upward. As the dual cam 200 moves upward, the slopes of the first ramp surface 210 and the second ramp surface 220 urge against the first wheel 405 and the second wheel 425, which drives the first bolt 400 and the second bolt 420 inward. When the user releases the handle 300, the force from the cam spring 350 drives the dual cam 200 downward, and the first bolt 400 and the second bolt 420 are driven outward by the first spring 412 and the second spring 432, respectively. In other aspects, the first wheel 405 and the second wheel 425 may be replaced with a roller, bearing, or other bearing surface. Similarly, in other aspects, the cam rollers 315 and 325 may be replaced with a wheel, bearing, or other bearing surface. In other aspects, the cam rollers 315 and 325 may replaced with pushing members immovably affixed to the cam roller axle 310. In other aspects, the cam roller axle 310 may directly contact and push against the dual cam 200.

Figure 9:
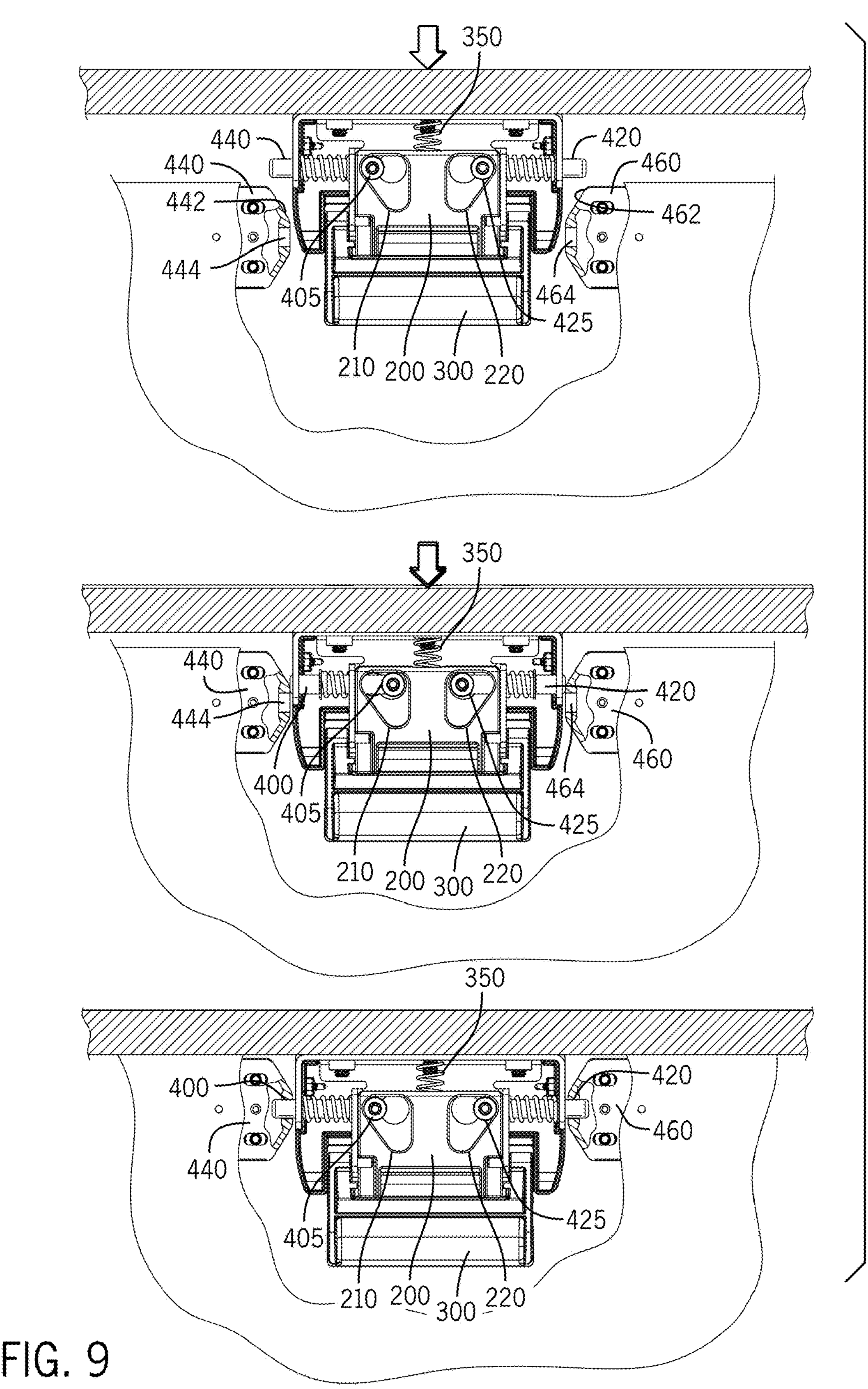
FIG. 9 are views of the latch showing the slam closing.
Figure 10:
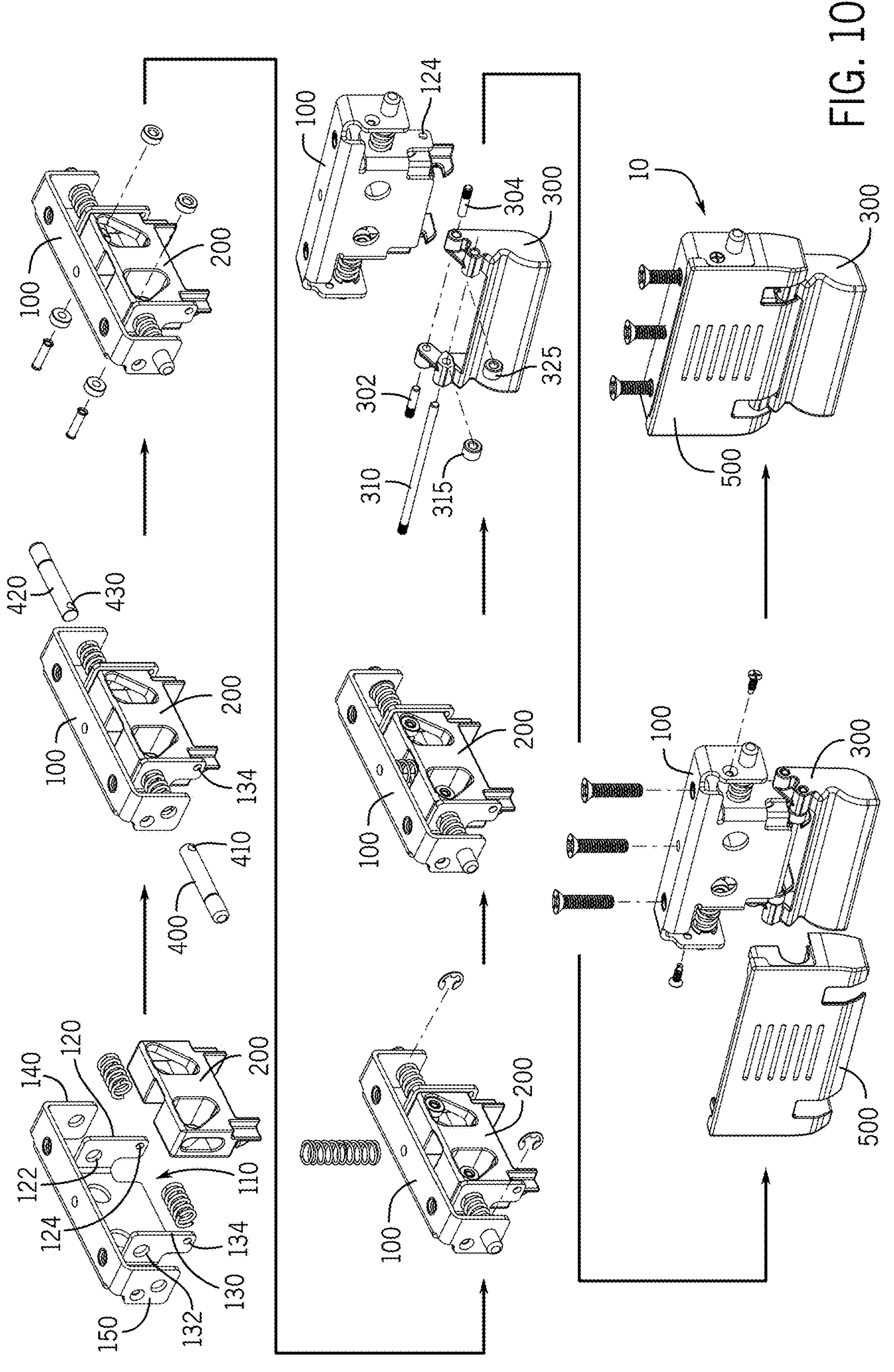
FIG. 10 are views of the installation process of the latch.

As shown in FIG. 9, the first bolt 400 and the second bolt 420 automatically secures to the first striker 440 and the second striker 460 when the lid 90 is closed by pushing the lid 90 closed or by the lid 90 falling to a closed position via gravity. The latch 10 provides a slam to close feature. As shown in FIG. 9, the first bolt 400 and the second bolt 420 move inward in the first opening 213 and the second opening 223 of the dual cam 200 when the outer end 402 of the first bolt 400 is urged against the contact surface 442 and the outer end 422 of the second bolt 420 is urged against the contact surface 462. During the closing, the outer ends 402 and 422 are driven against the downward sloping contact surfaces 442 and 462 of the first striker 440 and the second striker 460. The handle 300 does not move and does not need to be lifted during the closing procedure. The first opening 213 and the second opening 223 of the dual cam 200 provide space for the inward travel or movement of the first bolt 400 and the second bolt 420. It is not required that the first wheel 405 and the second wheel 425 are driven against the first ramp surface 210 and the second ramp surface 220 in order to slam the lid 90 closed.

In this aspect, the first bolt 400 and the second bolt 420 are not linked to the handle 300 or the dual cam 200. When the lid 90 is closed, the bolts 400 and 420 retract, but the dual cam 200 and handle 300 do not move, as the bolts 400 and 420 retract independently of the dual cam 200 and the handle 300. This provides convenience for the user as the handle 300 does not pop up when the user is closing the lid 90.

The latch 10 includes movement in three planes. During an opening movement of the latch 10, the handle 300 moves outward (away from the bracket 100), the dual cam 200 moves upward (toward the lid 90), and the first bolt 400 and the second bolt 420 moved inward (toward the bracket 100). In the aspect of FIGS. 1-10, during the opening movement, the first bolt 400 moves from left to right, while the second bolt 420 moves from right to left. Thus, the first bolt 400 and the second bolt 420 extend in opposite directions, i.e., the first bolt 400 and the second bolt 420 extend in inwardly toward the bracket 100 in opposite directions.

Although the latch 10 has been described with reference to a squad bench, the latch 10 may be used with single person benches, flip seats, other benches, cabinets, lockers and the like.

As such, it should be understood that the disclosure is not limited to the particular aspects described herein, but that various changes and modifications may be made without departing from the spirit and scope of this novel concept as defined by the following claims. Further, many other advantages of applicant's disclosure will be apparent to those skilled in the art from the above descriptions and the claims below.

What is claimed is:

1. A latch for a bench, comprising:
- a bracket;
- a dual cam positioned in a compartment of the bracket, the dual cam comprising a first ramp surface and a second ramp surface;
- a handle, the handle is pivotally engaged to the bracket;
- a first bolt and a second bolt are configured to extend and retract from the bracket;
- the first bolt is configured to engage a first striker;
- the second bolt is configured to engage a second striker;
- wherein the handle is configured to drive the dual cam upward when the handle is pulled upward; and
- wherein the first ramp surface is configured to drive the first bolt inward, and wherein the second ramp surface is configured to drive the second bolt inward.

2. The latch for a bench according to claim 1, wherein the first ramp surface and the second ramp surface angle inward and downward toward a center of the dual cam.

3. The latch for a bench according to claim 1, wherein the first bolt positions a first wheel against the first ramp surface, and the second bolt positions a second wheel against the second ramp surface.

4. The latch for a bench according to claim 3, wherein the first ramp surface is configured to urge against the first wheel, and the second ramp surface is configured to urge against the second wheel.

5. The latch for a bench according to claim 3, wherein slopes of the first ramp surface and the second ramp surface are configured to urge against the first wheel and the second wheel and drive the first bolt and the second bolt inward.

6. The latch for a bench according to claim 1, wherein the bracket includes inner lateral walls that define the compartment, and the dual cam is positioned between the inner lateral walls.

7. The latch for a bench according to claim 1, wherein the latch is configured to fit between the first striker and the second striker in a closed position of the latch, wherein the first bolt is spring biased to engage with the first striker, wherein the second bolt is spring biased to engage the second striker.

8. The latch for a bench according to claim 1, wherein the latch is configured to fit between the first striker and the second striker in a closed position of the latch, wherein the first bolt extends outward to engage with the first striker, wherein the second bolt extends outward to engage with the second striker, wherein the first bolt and the second bolt extend in opposite directions.

9. The latch for a bench according to claim 1, wherein the first striker includes a first contact surface, and the second striker includes a second contact surface, the first and second contact surfaces slope inward toward a center of the latch.

10. The latch for a bench according to claim 9, wherein an outer end of the first bolt is configured to urge against the first contact surface and an outer end of the second bolt is configured to urge against the second contact surface, which drives the first bolt and the second bolt inward toward the center of the latch and provides automatic engagement of the latch to the first and second strikers.

11. The latch for a bench according to claim 1, wherein a cam spring is positioned between a lower surface of a top wall of the bracket and the dual cam, the cam spring urges or drives the dual cam downward, which biases the handle to a closed position.

12. A latch for a bench, comprising:

a bracket;

a dual cam positioned in a compartment of the bracket, the dual cam comprising a first ramp surface and a second ramp surface;

a handle, the handle is pivotally engaged to the bracket;

a first bolt and a second bolt are configured to extend and retract from the bracket;

the first bolt is configured to engage a first striker;

the second bolt is configured to engage a second striker;

wherein the handle is configured to drive the dual cam upward;

wherein the first ramp surface is configured to drive the first bolt inward, and wherein the second ramp surface is configured to drive the second bolt inward; and wherein the handle is pivotally engaged to the bracket via handle pins, wherein the handle comprises a cam roller axle with a first cam roller and a second cam roller rotatably mounted on the cam roller axle.

13. The latch for a bench according to claim 12, wherein the cam rollers are configured to move upward and drive against contact surfaces on a lower surface of the dual cam when the handle is pulled upward and pivots relative to the handle pins.

14. The latch for a bench according to claim 12, wherein the cam roller axle is offset or spaced from the handle pins.

15. The latch for a bench according to claim 12, wherein the cam rollers are configured to move upward in an arcuate path to drive against contact surfaces of the dual cam.

16. A bench, comprising:

a lower portion and a lid, wherein the lid is hingedly engaged to a rear wall of the lower portion;

a latch, comprising:

a bracket;

a dual cam positioned in a compartment of the bracket, the dual cam comprising a first ramp surface and a second ramp surface;

a handle, the handle is pivotally engaged to the bracket;

a first bolt and a second bolt are configured to extend and retract from the bracket;

the first bolt is configured to engage a first striker;

the second bolt is configured to engage a second striker;

wherein the handle is configured to drive the dual cam upward;

wherein the first ramp surface is configured to drive the first bolt inward, and wherein the second ramp surface is configured to drive the second bolt inward; and wherein the bracket is installed on an underneath surface of the lid, the first striker and the second striker are installed on an exterior surface of a front wall of the lower portion.

17. A latch for a bench, comprising:

a bracket;

a dual cam is configured to move relative to the bracket, the dual cam comprising a first ramp surface and a second ramp surface;

a handle, the handle rotatably engaged to the bracket, the handle is configured to rotate relative to the bracket;

the handle comprises a cam roller axle with a first cam roller and a second cam roller rotatably mounted on the cam roller axle;

the cam roller axle is offset or spaced from an axis of rotation of the handle;

a first bolt and a second bolt; wherein the first bolt positions a first wheel or bearing against the first ramp surface, and the second bolt positions a second wheel or bearing against the second ramp surface;

the first bolt is configured to engage a first striker;

the second bolt is configured to engage a second striker; and wherein a lifting movement applied to the handle drives the first cam roller and the second cam roller against the dual cam, which drives the dual cam upward.

18. The latch for a bench according to claim 17, wherein the first bolt positions the first wheel or bearing against the first ramp surface, and the second bolt positions the second wheel or bearing against the second ramp surface, and an upward movement of the dual cam urges the first ramp surface against the first wheel or bearing and urges and the second ramp surface against the second wheel or bearing.

19. A latch for a bench, comprising:

a bracket, the bracket comprising interior walls;

a dual cam, the dual cam is movably positioned between the interior walls of the bracket, the dual cam comprising a first ramp surface and a second ramp surface;

a cam spring is positioned between the bracket and the dual cam to urge the dual cam downward;

a handle, the handle is engaged to the bracket via handle pins, the handle is configured to rotate relative to the bracket via the handle pins;

the handle comprises a cam roller axle with a first cam roller and a second cam roller rotatably mounted on the cam roller axle;

the cam roller axle is offset or spaced from the handle pins;

the first cam roller and the second cam roller are configured to urge against a bottom surface of the dual cam to move the dual cam upward; and a first bolt and second bolt, the first and second bolt are biased outward; and wherein the first bolt positions a first wheel against the first ramp surface, and the second bolt positions a second wheel against the second ramp surface.

* * * * *